R. NIELSEN.
PLUMB LEVEL.
APPLICATION FILED JUNE 27, 1913.

1,120,737.

Patented Dec. 15, 1914.
2 SHEETS—SHEET 1.

WITNESSES
Paul A. Viersen.
F. C. Higgins

INVENTOR
R. Nielsen
H. Darden
BY        ATTY.

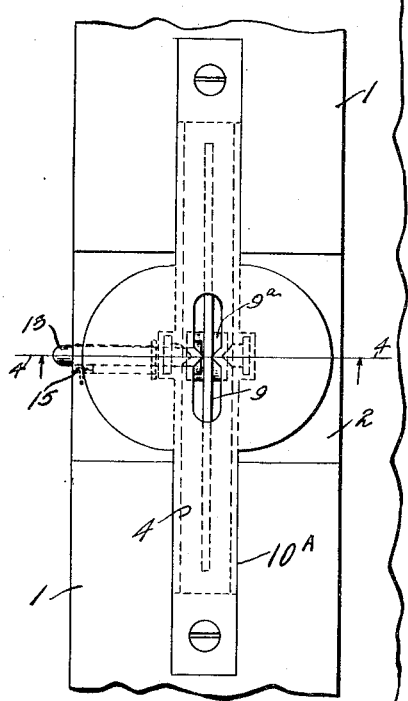
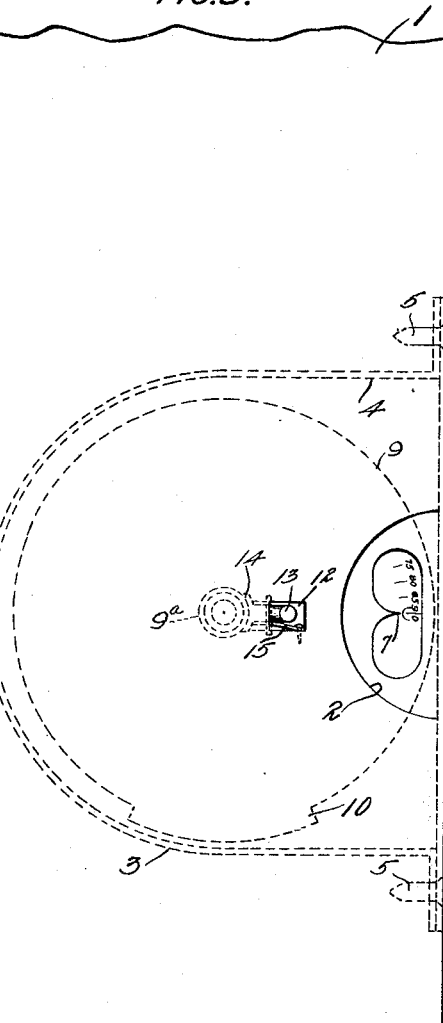
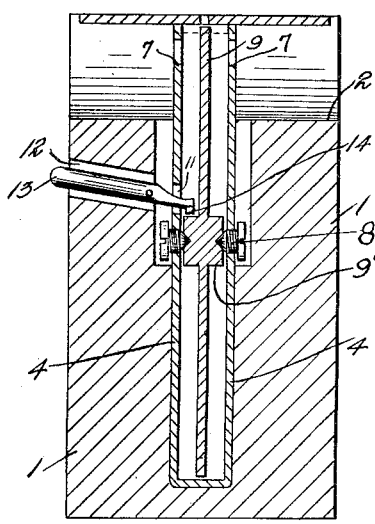

UNITED STATES PATENT OFFICE.

ROBERT NIELSEN, OF KAMSACK, SASKATCHEWAN, CANADA.

PLUMB-LEVEL.

1,120,737.　　　　Specification of Letters Patent.　　Patented Dec. 15, 1914.

Application filed June 27, 1913. Serial No. 776,079.

*To all whom it may concern:*

Be it known that I, ROBERT NIELSEN, a citizen of the United States, residing at Kamsack, in the Province of Saskatchewan and Dominion of Canada, have invented certain new and useful Improvements in Plumb Levels, of which the following is a specification.

This invention relates to improvements in plumb levels and its object is to produce a device of this class that is simple in construction and efficient in operation.

A further object is the provision of temporary locking means for the dial or indicator by which the same can be retained in its position showing the desired reading after the position of the instrument has been altered.

With the foregoing and other objects in view the invention consists in the combination and arrangement of parts to be hereinafter fully described in the following specification, pointed out in the claims and illustrated in the accompanying drawings which form a part of said specification and in which—

Figure 1:
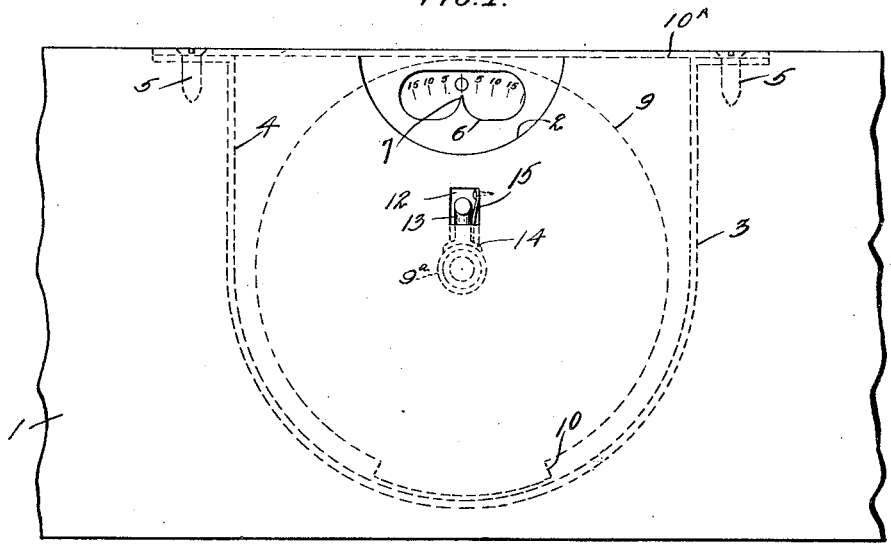
Figure 2:
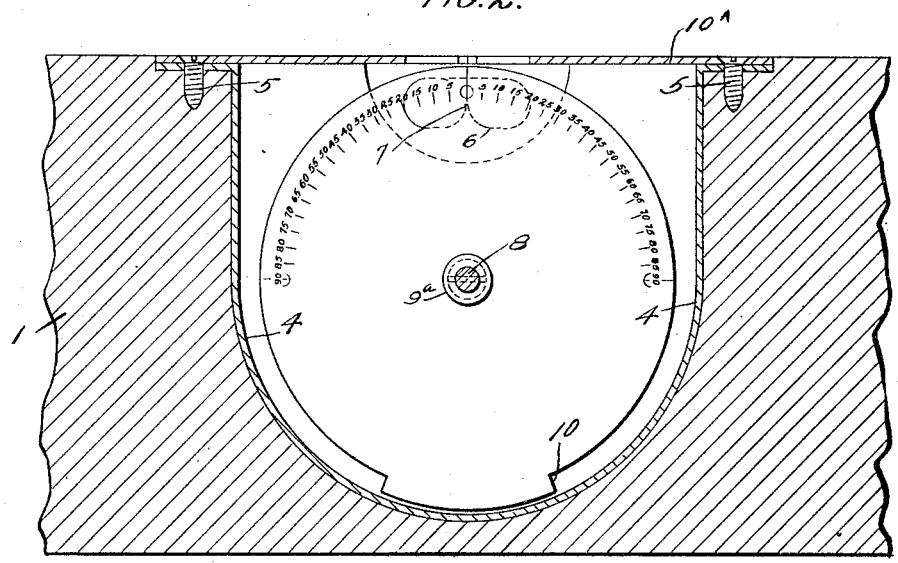

Figure 1 is a side elevation of my improved plumb level with part of the frame broken away. Fig. 2 is a longitudinal section in side elevation. Fig. 3 is a plan of the device shown in Fig. 1. Fig. 4 is a section taken on line 4—4 of Fig. 3. Fig. 5 is a view of the device standing on end in which position it is used as a plumb.

Like reference characters indicate corresponding parts throughout the several views.

My device comprises a rectangular frame 1 which may be of any substantial material or design and which is provided with a recess 2 in its front face and formed with a socket 3 within which a metal casing 4 is disposed; said casing having its extremities secured by screws or other suitable fastening means 5, 5 to the front face of the frame. The casing 4 projects up through the recessed portion 2 of the frame and is formed with an aperture or sight 6 and an indicator 7 in each lateral face.

Within the casing 4 adjusting screws 8—8 are secured upon which a rotary disk 9, formed with a hub $9^a$, is secured that carries a weight 10 upon one portion of its periphery. The disk 9 is graduated into degrees along one half of its circumference, the center of the graduated portion being marked to indicate zero and the quadrants on each side thereof being marked to indicate successively in opposite directions 90 degrees. The weight 10 is disposed upon the circumference of the disk diametrically opposite the point zero, which latter point is kept opposite the pointers or indicators 7 by the said weight when the instrument is in horizontal position.

$10^A$ is a face plate secured to the front face of the frame.

One side of the casing is apertured as at 11 and the frame is apertured in alinement therewith as at 12 and in the apertured portion of said frame a pin 13 is pivotally hung which is formed at its inner termination with a shoe 14 capable of contact with the hub of the disk 9. A spring 15 secured in the apertured portion of the frame 1 bears against the pin 13 to retain it in an adjusted position.

When a reading is taken by the instrument the disk 9 may be retained in the position showing the reading by manually forcing the shoe 14 against the hub of the disk when the spring 15 will retain it together with the said disk in that position.

What is claimed is:—

1. In a combined level and plumb, a frame formed with a recess in its front face and with a socket opening into said recess, a casing disposed within said socket and projected into the recessed portion of said frame, a pointer formed integral with said casing, a rotary disk journaled in said casing and adapted to move independently thereof as said frame is moved, a weight circumferentially carried by said disk and means carried by said frame for releasable locking engagement with said rotary disk for retaining the same in an adjusted position with relation to the pointer of the said casing.

2. In a combined level and plumb, a frame formed with a recess in its front face and with a socket opening into said recess, a casing disposed within said socket and projected into the recessed portion of said frame, a pointer formed integral with said casing, a rotary disk journaled in said casing and adapted to move independently thereof as said frame is moved, a weight circumferentially carried by said disk and a spring-pressed locking pin pivoted in said frame for releasable engagement with the said disk.

In testimony that I claim the foregoing as my own I have hereto affixed my signature in the presence of two subscribing witnesses.

ROBERT NIELSEN.

Witnesses:
ALBERT LINDGREN,
EMIL W. ELLICKSON.